United States Patent [19]

Nagashima et al.

[11] Patent Number: 4,908,050
[45] Date of Patent: Mar. 13, 1990

[54] OIL MIST REMOVER

[75] Inventors: Tsuneo Nagashima; Makoto Yamane, both of Osaka, Japan

[73] Assignees: Tabai Espec Co. Ltd.; Itoman & Co. Ltd., both of Osaka; Taichi Uchida, Kyoto, all of Japan

[21] Appl. No.: 395,134

[22] Filed: Aug. 15, 1989

Related U.S. Application Data

[63] Continuation of Ser. No. 237,238, Aug. 26, 1988, abandoned.

[30] Foreign Application Priority Data

Aug. 31, 1987 [JP] Japan .................. 62-218122
Aug. 31, 1987 [JP] Japan .................. 62-218127
Aug. 31, 1987 [JP] Japan .................. 62-133312[U]
Oct. 20, 1987 [JP] Japan .................. 62-265692

[51] Int. Cl.$^4$ ............................................. B01D 45/00
[52] U.S. Cl. ........................................ 55/400; 55/319; 55/465; 55/466; 55/320
[58] Field of Search ............ 55/400, 465, 466, 319, 55/320

[56] References Cited

U.S. PATENT DOCUMENTS

| 864,158 | 8/1907 | De Lany | 55/465 |
| 1,211,310 | 1/1917 | Griffin | 55/465 |
| 2,742,976 | 4/1956 | Toth et al. | 55/465 |
| 3,923,480 | 12/1975 | Visch | 55/465 |
| 4,189,310 | 2/1980 | Hotta | 55/400 |

FOREIGN PATENT DOCUMENTS

| 2378555 | 8/1978 | France | 55/400 |
| 13227 | 4/1970 | Japan | 55/400 |
| 61612 | 3/1987 | Japan | 55/400 |
| 119829 | 5/1988 | Japan | 55/400 |
| 778750 | 11/1980 | U.S.S.R. | 55/400 |

*Primary Examiner*—Bernard Nozick
*Attorney, Agent, or Firm*—Koda & Androlia

[57] ABSTRACT

This is an oil mist remover used in purifying polluted air containing oil mist generated in a factory or the like, which is capable of lessening the load of the filter, preventing deterioration of the filter, and maintaining a high efficiency if used for a long period, by removing large particles of oil mist and dust contained in the air inhaled from the suction hole before adsorption on the filter. It is composed of main body case, straightening box having a suction hole provided before the main body case, ventilation chamber having exhaust means behind the main body case, and drain chamber having liquid discharge means provided beneath the main body case, in which means for interrupting the straightforward move of the inhaled air is provided inside the suction hole, and the oil mist depositing on this means is dropped, and is collected in the drain chamber to be discharged.

6 Claims, 13 Drawing Sheets

OIL MIST REMOVER

This is a continuation of application Ser. No. 237,238, filed August 26, 1988 now abandoned.

BACKGROUND OF THE INVENTION

1. Field of the Invention

This invention relates to an oil mist remover, and more particularly to an oil mist remover used for purifying the polluted air containing oil mist generated in a factory or the like.

2. Prior Art

In a conventional oil mist remover, the air introduced from the suction hole was filtered to be rid of oil mist and dust, but the filter was frequently clogged, and the oil mist removal efficiency was lowered.

In other device, a straightening box was provided to remove large mist particles before the oil mist removal in the main body case. In this case, however, the oil demisted and recovered in the main body case, and the oil demisted and recovered in the straightening box were discharged through separate drain pipes. It was inconvenient because the oils must be recovered from two drain pipes. To eliminate this inconvenience, in order to gather oils into one place, an additional piping was required, which not only required another space but also raised the cost.

In such structure, still worse, since the straightening box was in negative pressure, air was sucked in from the drain pipe, and discharge of oil in the straightening box was impeded, and, in a worst case, the oil was blown up to be oil drops, and entered the main body box through the straightening box, which lowered the removal efficiency.

Moreover, in the conventional structure, since it was difficult to dismount the straightening box from the main body case, maintenance inside the main body case, such as replacement of filter, was very troublesome.

BRIEF SUMMARY OF THE INVENTION

This invention, in the light of the background stated above, took notice of the fact that it would greatly contribute to reduce the filter load, prevent filter deterioration, and maintain a high removal efficiency even if used for a long period, by removing large particles of oil mist and dust contained in the air sucked in from the suction port before adsorption on the filter, and discharging the demisted and recovered oil by gathering at one place in the equipment.

It is hence a primary object of this invention to present an oil mist remover for removing large particles of oil mist and dust contained in the air introduced from the suction hole before adsorption on the filter so as to lessen the load of the filter, prevent deterioration of the filter, and retard lowering of the removal efficiency if used for a long period.

It is other object of this invention to present an oil mist remover capable of smoothly discharging the oil recovered in a straightening box.

It is another object of this invention to present an oil mist remover capable of discharging by gathering the demisted and recovered oils at one place in the equipment.

It is a further different object of this invention to present an oil mist remover having a shielding plate with a packing to isolate the air stream disposed between the main body case and the door.

Features and benefits of this invention, as well as further objects thereof, will be more clearly understood from the detailed description below given in conjunction with the accompanying drawings.

In order to achieve these and other objects of this invention to be disclosed in the following explanation, in this invention, a baffle plate for interrupting the straightforward advance of inhaled air is disposed inside of the suction hole so as to drop the oil mist depositing on the baffle plate, a door having a straightening box is provided before the main body case, a drain chamber is formed beneath the main body case and the door, and drain holes are formed in the bottom of the main body case and door so that the oils in the main body case and the straightening box may flow into the drain chamber.

Adjacently to the straightening box, an adjustment chamber is disposed, and a drain hole communicating with the straightening box and another drain hole communicating with the lower space are disposed in this adjustment chamber, and the hole area of the drain hole communicating with the straightening box is set larger than the drain hole communicating with the lower space.

Furthermore, it is designed to seal the air flow by disposing a shielding plate having a packing between the main body case and the door.

By thus composing, it is possible to remove large particles of oil mist and dust in the air inhaled through the suction hole before adsorption on the filter, and discharge smoothly.

The baffle plate is located in the straightening box inside of the suction hole to interrupt the straightforward advance of the air, and when large particles of oil mist and dust contained in the air contact with the baffle plate, they deposit on the baffle plate. When a specified quantity of oil mist and dust is collected on the baffle plate, these particles of oil mist and dust flow down on the surface of the baffle plate. In this way, the air right after inhalation is pretreated by the baffle plate before reaching the filter, so that large particles of oil mist and dust are removed.

As a result, the air reaching the filter contains only small particles of oil mist and dust, being free from large particles, so that deterioration of filter may be retarded.

The straightening box, when fabricated in unit form, can be easily attached to or detached from the main body case, and through the drain hole provided near the bottom, the oil in the box is discharged into the drain chamber through the bottom of the main body case.

Since the drain hole of the adjustment chamber is wider in drain area than the drain hole of the straightening box, it is possible to disperse the air flowing into the straightening box from the adjustment chamber, and lower the wind pressure. Therefore, the oil can be passed into the adjustment chamber from the drain hole. As for the drain hole, while the quantity of oil staying in the adjustment chamber is small, the oil does not flow due to air blow-up, but when collected to a certain amount, the pressure (the own weight) of the oil exceeds the wind pressure, and the oil is discharged.

BRIEF DESCRIPTION OF THE DRAWINGS

FIG. 1 to FIG. 5 denote a first embodiment of an oil mist remover of this invention, in which FIG. 1 is a longitudinal sectional view of the oil mist remover, FIG. 2 is an A—A line sectional view of FIG. 1, FIG. 3 is a perspective outline view from the front side of this remover, FIG. 4 is a perspective outline view from the rear side of the remover, and FIG. 5 is a perspective view of the front part of the remover, with the cover being removed;

FIG. 7 to FIG. 10 denote a third embodiment of an oil mist remover of this invention, in which FIG. 7 is a longitudinal sectional view of the oil mist remover, FIG. 8 is a explanatory diagram showing its internal structure, FIG. 9 is a perspective view showing an assembled state of filter and filter holder, and FIG. 10 is a perspective view of filter and filter holder; and FIG. 11 to FIG. 15 denote a fourth embodiment of an oil mist remover of this invention, in which FIG. 11 is a longitudinal sectional view of the oil mist remover, FIG. 12 is a perspective view of the remover with the door taken off, FIG. 13 is a perspective view of a shielding plate with a packing, FIG. 14 is a sectional view of the packing, and FIG. 15 is a magnified view of part A.

DETAILED DESCRIPTION OF THE INVENTION

Figure 1:
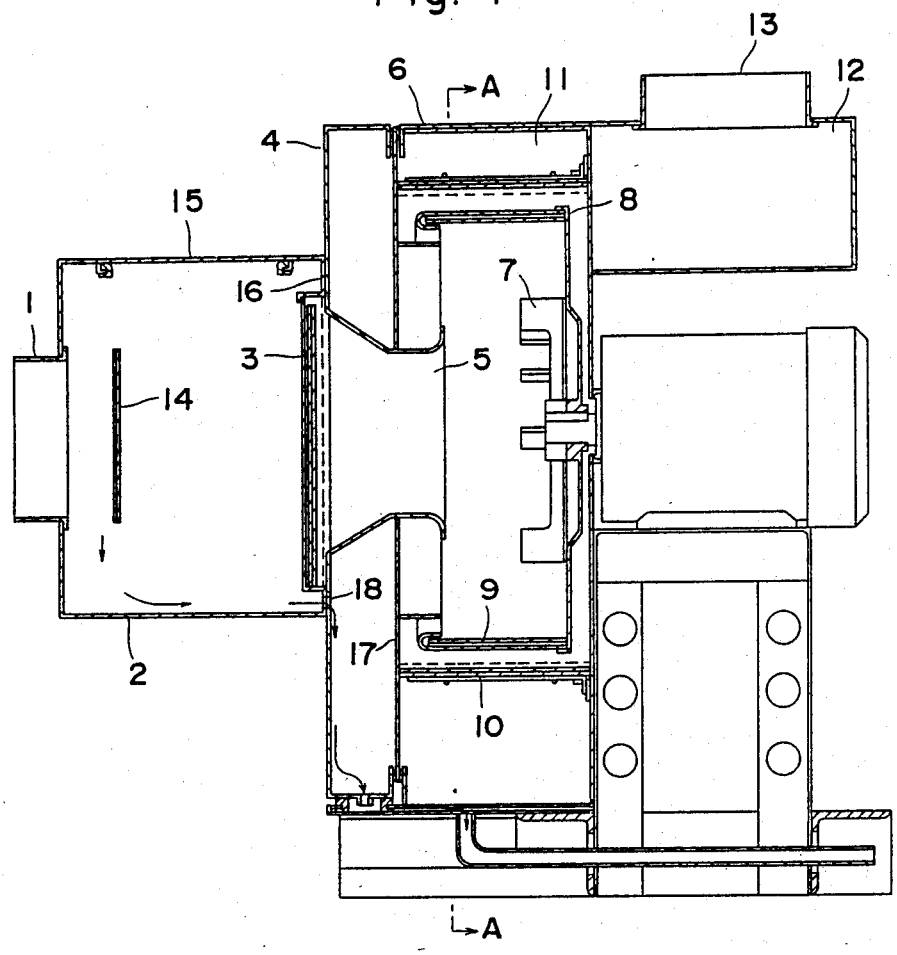
Figure 2:
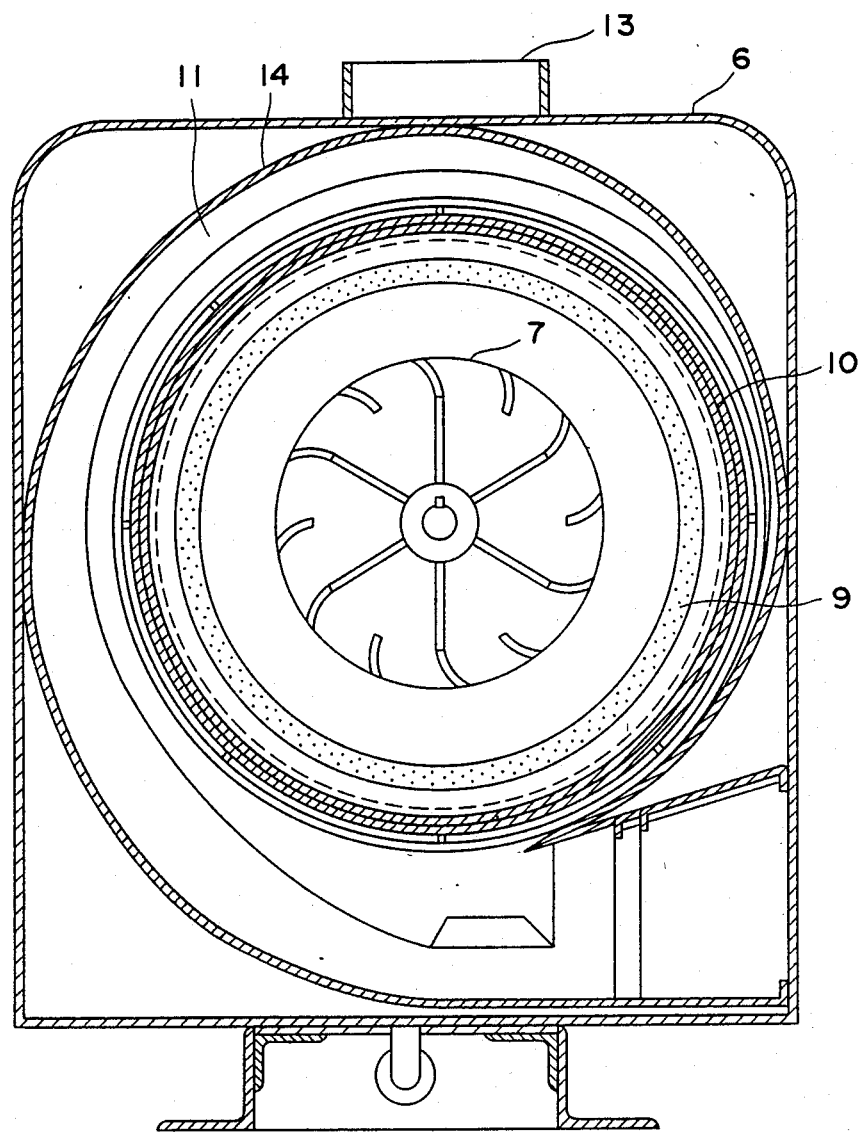
Figure 3:
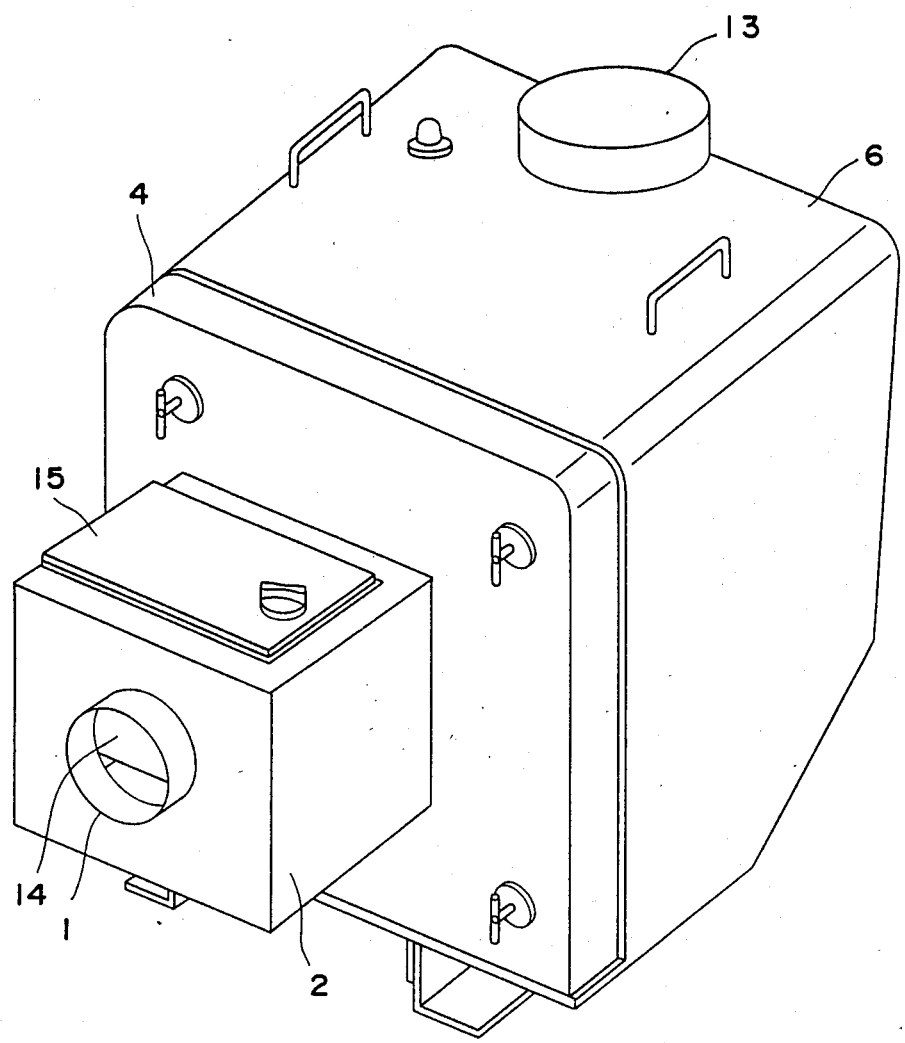
Figure 4:
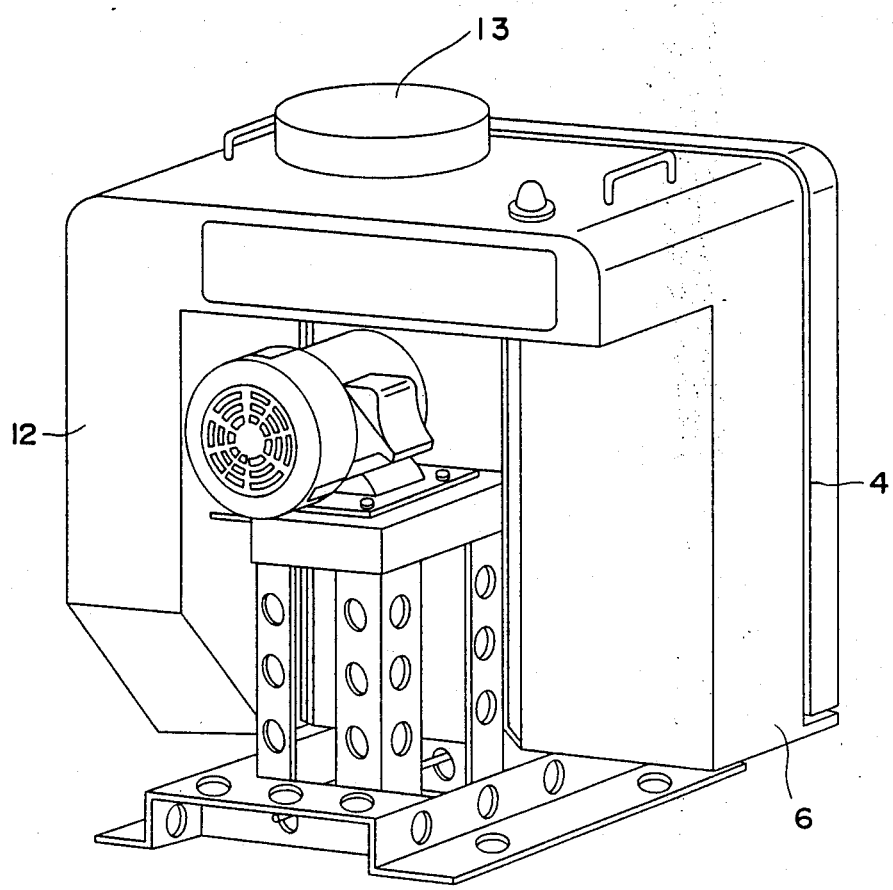

Referring now to the drawings, preferred embodiments of this invention are described below in details.

FIG. 1 to FIG. 5 denote a first embodiment of an oil mist remover of this invention, and the outline of the shown oil mist remover is first explained.

In this equipment, as shown in FIG. 1, the air inhaled through a suction hole 1 enters a straightening box 2, and is diffused outside of a drum 8 by a fan 7 in a main body case 6 through a suction guide 5 penetrating through a front filter 3 and a door 4. This drum 8 is provided with a rotary filter 9, and the air passing through this rotary filter 9 further passes through a fixed filter 10, runs through a ventilation chamber 11 and a guide hole 12 provided in the rear part of the main body case 6, and is discharged from an exhaust hole 13 formed on the main body case 6.

In the oil mist remover of this invention, inside the suction hole 1, a baffle plate 14 for interrupting the straightforward advance of the sucked air is disposed in the longitudinal direction, so as to drop the oil mist depositing on the baffle plate 14.

Figure 5:
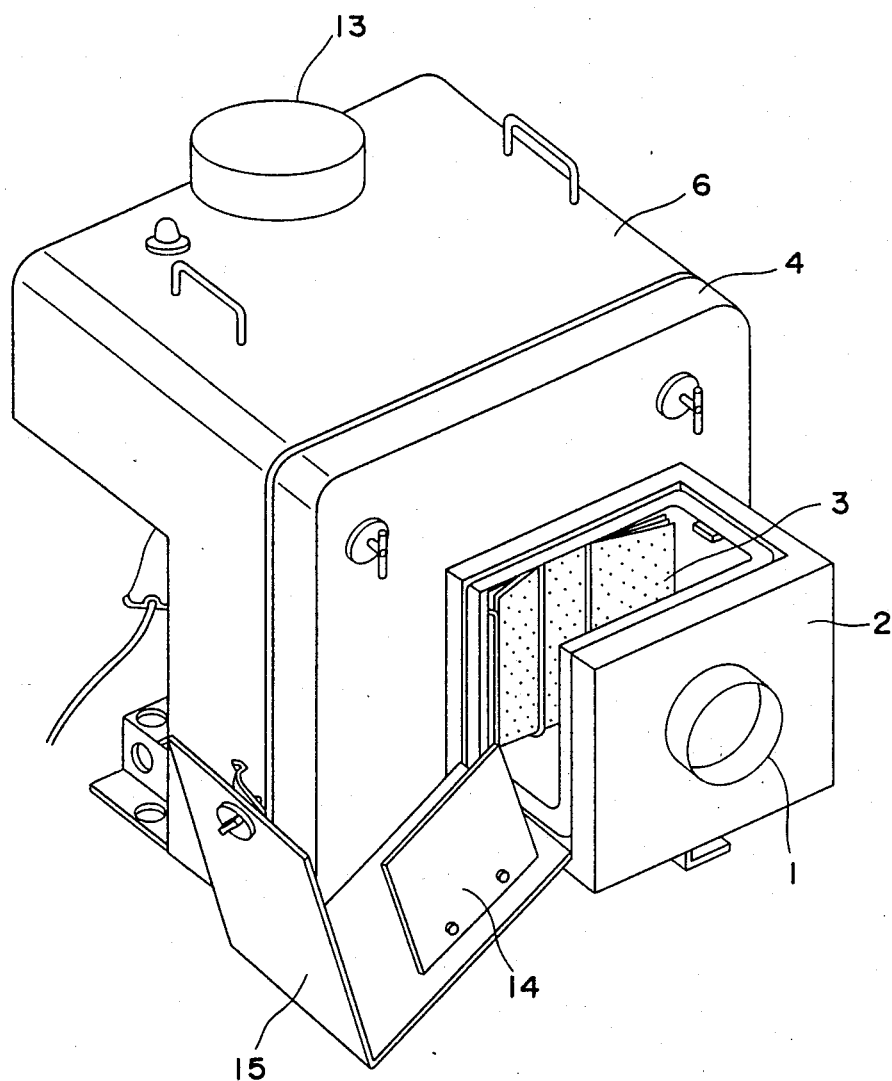

In further details, there is a cover 15 for opening and closing the straightening box 2, disposed between the suction hole 1 and the door 4, and the baffle plate 14 is attached to this cover 15 as shown in FIG. 5.

The straightening box 2 and the door 6 are formed into one body by way of a partition 16. Inside are disposed the baffle plate 14, front filter 3 and suction guide 5 sequentially along the air flow. The door is detachably fitted to the main body case 6 across a shielding plate 17.

The baffle plate 14 is located opposite to the suction hole 1, slightly inside of the suction hole 1 when the cover 15 is shut, and the air led in from the suction hole 1 moves straightly inward, hits against the baffle plate 14, and further flows inside from the upper and lower spaces or side spaces of the baffle plate 14.

At this time, relatively large particles of oil mist and dust of the air hitting against the baffle plate 14 deposit on the baffle plate 14 when contacting therewith. The air being rid of large particles of oil mist and dust by the baffle plate 14 further flows inward so as to be deprived of smaller particles of oil mist and dust.

When the oil mist and dust depositing on the baffle plate 14 increase in quantity, they flow down the surface of the baffle plate 14, and drop into the bottom of the straightening box 2.

The falling oil mist further flows in the bottom of the straightening box 2, and passes the lower part of the door 4 and main body case 6 from the drain hole 18, and is discharged outside the equipment. Beneath the main body case 6, moreover, it is mixed with the oil mist flowing out from the main body case 6.

The cover 15 is free to open in order to enable to clean the inside of the baffle plate 14 and the straightening box 2, and to replace the front filter 3.

Therefore, in this embodiment, since the air sucked in from the suction hole 1 is interrupted in the straight flow by the baffle plate 14, and it hits against the baffle plate 14, and at this time relatively large particles of oil mist and dust contained in the air are removed by the baffle plate 14, and deterioration of the filter may be effectively prevented by using the oil mist remover of this invention.

Figures 6A, 6B:
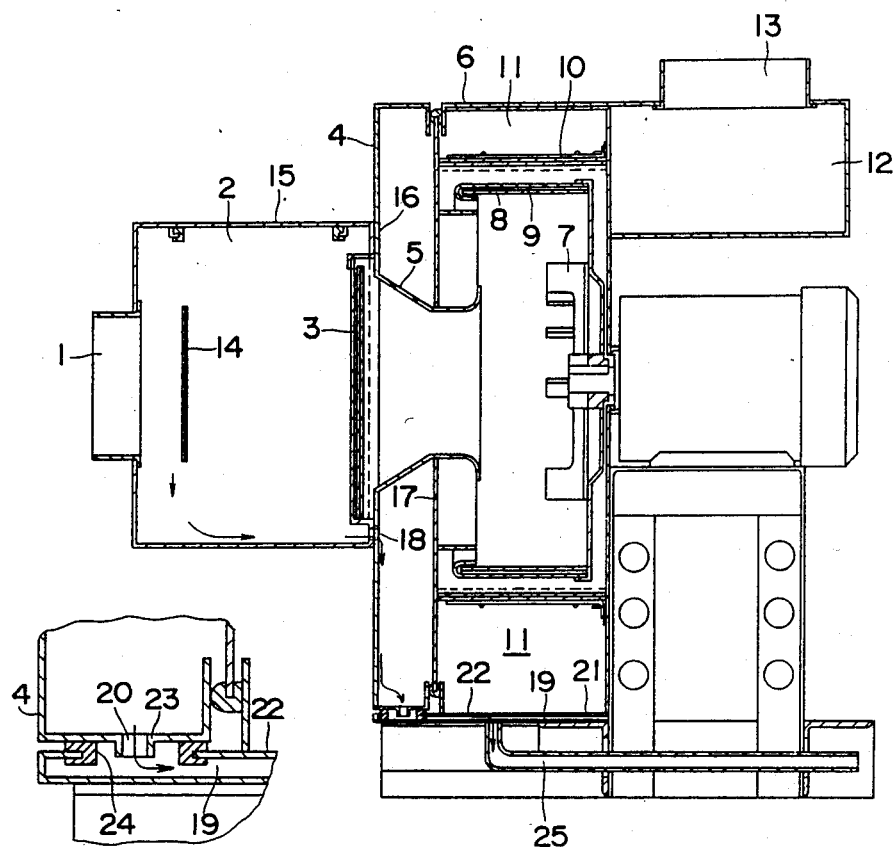
FIG. 6A is a longitudinal sectional view showing a second embodiment of an oil mist remover of this invention.
FIG. 6B is an enlarged view of the encircled area of the FIG. 6A.

FIG. 6 shows a second embodiment of this invention. What is different from the first embodiment is that a drain chamber 19 is formed beneath the door 4 and the main body case 6, and that drain holes 20, 21, etc. are formed in the bottom of the door 4 and main body case 6, while other members of the equipment are identical with those in the first embodiment.

The drain chamber 19 is formed beneath the door 4 and the main body case 6. This drain chamber 19 is integrally formed with the main body case 6, and it is communicated with the main body case 6 through the drain hole 21 of the ventilation chamber outer wall 22. Meanwhile, the door 4, when it is attached to the main body case 6, tightly contacts with the drain chamber 19, and a drain pipe 23 of the door 4 is inserted into an opening 24 in the drain chamber 19, at the same time. Besides, a discharge pipe 25 is connected to the bottom of the drain chamber 19.

The flow of the recovered oil is described in further details. In the straightening box 2, the entering air is rid of large particles of oil mist and dust by the baffle plate 14 and front filter 3, and oil drops into the bottom of the straightening box 2. The falling oil and dust pass through the drain hole 18 and flow into the door 4, reaching from the drain pipe 23 to the drain chamber 19. On the other hand, the oil separated and removed by the rotary filter 9 and fixed filter 10 in the main body case 6, and the oil depositing on the ventilation chamber outer wall 22 flow into the drain chamber 19 through the drain hole 21. The oils thus gathered into one place are discharged from the discharge pipe 25.

In the second embodiment, the drain chamber 19 is placed and fixed on the main body case 6 side, and door 4 is installed to allow the drain to drop, so that the attaching or detaching of the door and concentrated recovery of oil can be achieved at the same time.

Therefore, the oils recovered in the straightening box 2 and in the main body case 6 can be collected in the drain chamber 19 through the drain holes 20, 21, so that the oil can be recovered easily, and at the same time the piping around the equipment can be simplified, and the handling is easier and the cost is saved.

FIG. 7 to FIG. 10 denote a third embodiment, in which an adjustment chamber 26 is disposed adjacently to the straightening box 2, and a drain hole 27 communicating with the straightening box 2 and a drain hole 28 communicating with the lower space are formed in this adjustment chamber 26, and the hole area of the drain hole 27 communicating with the straightening box 2 is greater than that of the drain hole 28 communicating with the lower space.

Figure 7:
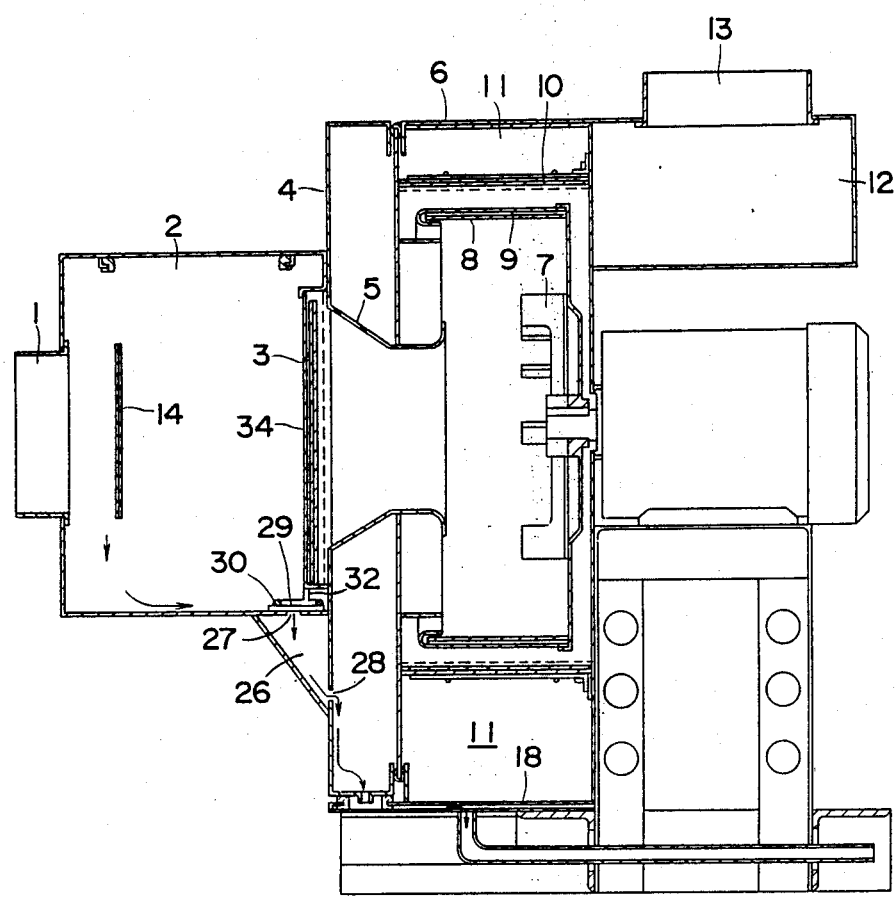
Figure 8:
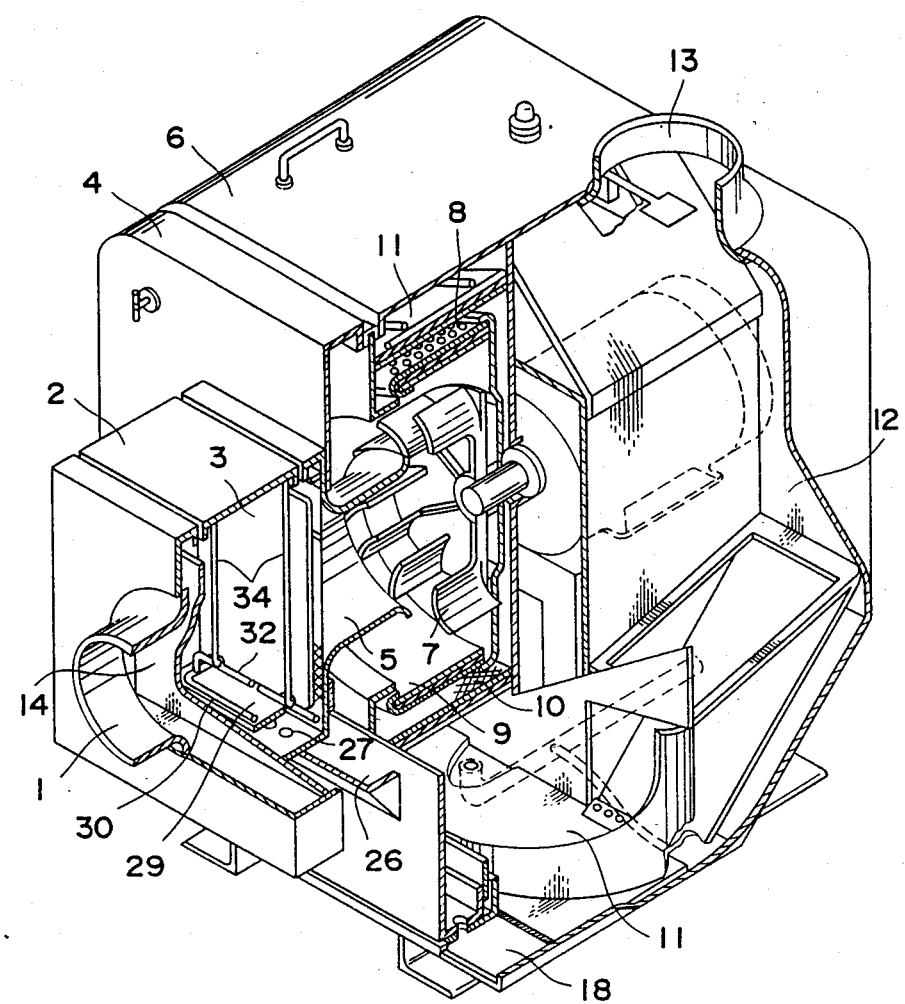
Figure 9:
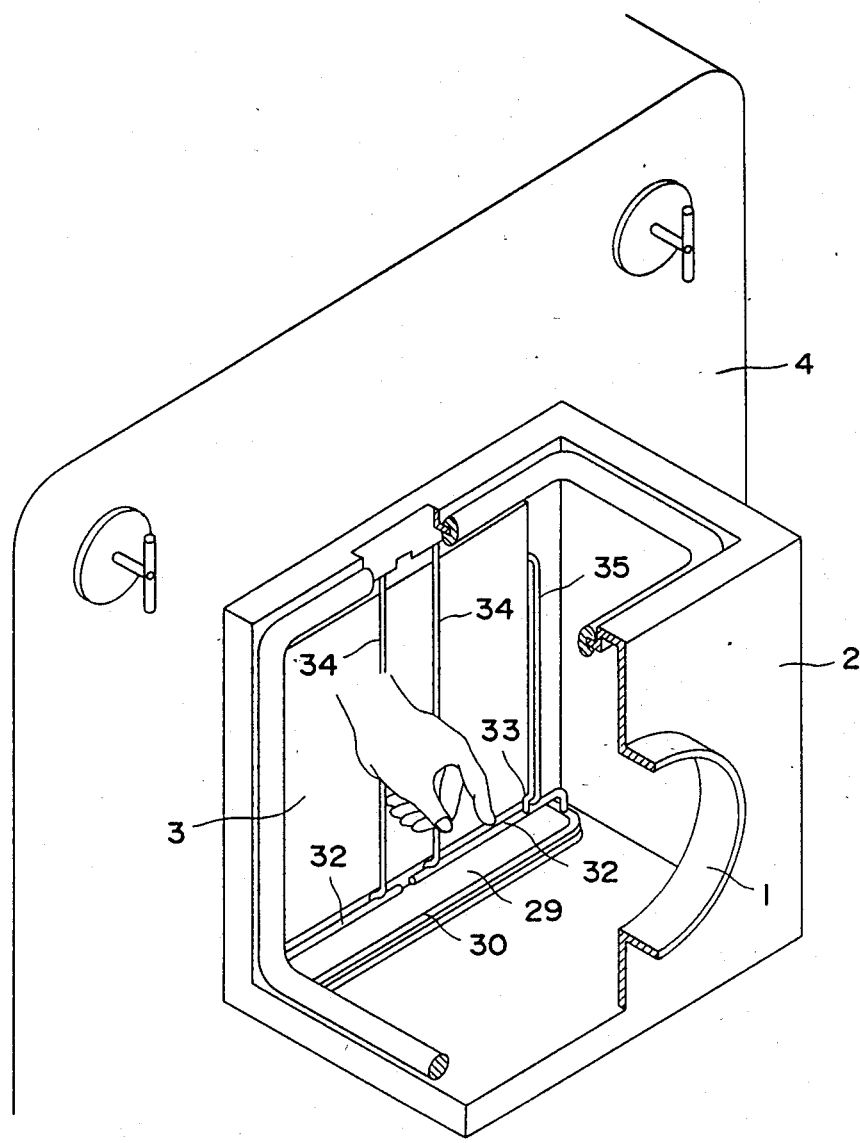
Figure 10:
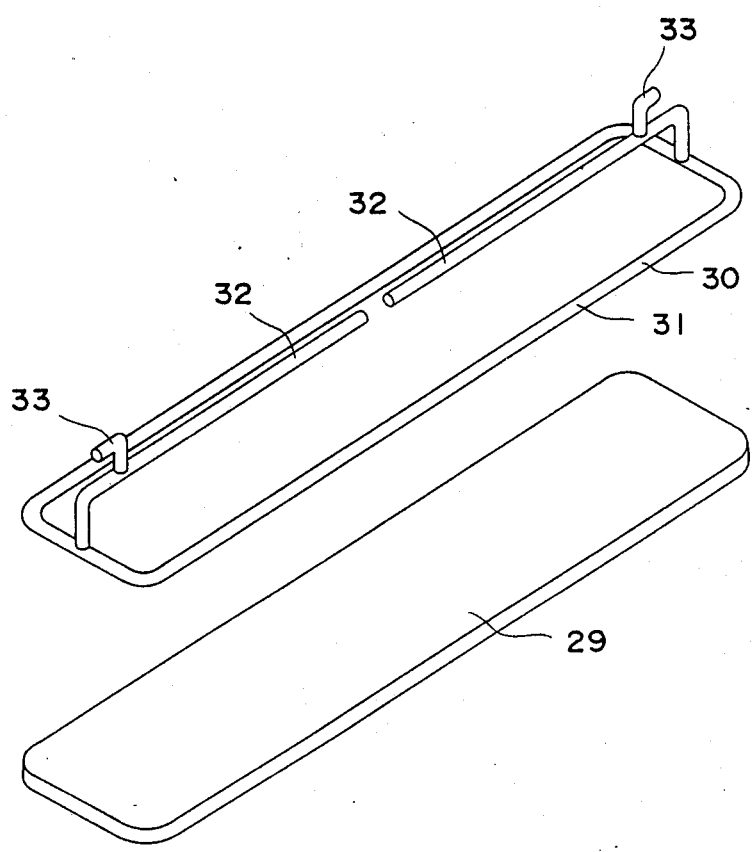

As shown in FIG. 7, the adjustment chamber 26 is integrally connected with the straightening box 2, and the drain hole 27 communicating with the straightening box 2 in the connecting part and the drain hole 28 communicating with the lower space in the door 4 are provided in a plurality, respectively. Above the drain hole 27 communicating with the straightening box, as shown in FIG. 8 and FIG. 9, an adjustment chamber filter 29 is provided, and a filter holder 30 is used for fixing the filter. The filter holder 30 has upper arms 32 consecutively disposed on two sides of a rectangular framework 31 inward, and protrusions 33 are projecting from the upper arms 32. When the filter 29 and filter holder 30 are assembled in the equipment, the right and left upper arms 32 are pushed down by two holding rods 34 for supporting the front filter 3, and the protrusions 33 are stopped at the lower end of the guide rods 35.

Therefore, the oil mist dropping into the bottom of the straightening box 2 is forced to the door 4 side by the air stream, and reaches the drain holes 27 communicating with the straightening box. Since the drain hole 27 communicating with the straightening box is larger than the drain hole 28 communicating with the lower space, the pressure of the air flow from the drain hole 27 communicating with the straightening box to the adjustment box 2 is lowered, so that the oil may drop into the adjustment chamber 26.

The dropping oil is gradually collected in the adjustment chamber 26, and is first blown up by the wind pressure from the drain hole 28, but when reaching a certain amount, the pressure (the own weight) of the oil exceeds the blow-up force, and the collected oil is discharged from the drain hole 28 communicating with the lower space.

In the third embodiment, since the adjustment chamber filter 29 is provided to prevent the dust from flowing into the drain hole 27 communicating with the straightening box, it is advantageous to prevent clogging of the drain hole 28 communicating with the lower space which has the smaller hole area.

Therefore, without keeping the oil stagnant in the straightening box 2 and without lowering the removal rate by oil drops being blown up, the recovered oil can be discharged through the drain holes 27, 28.

Figure 11:
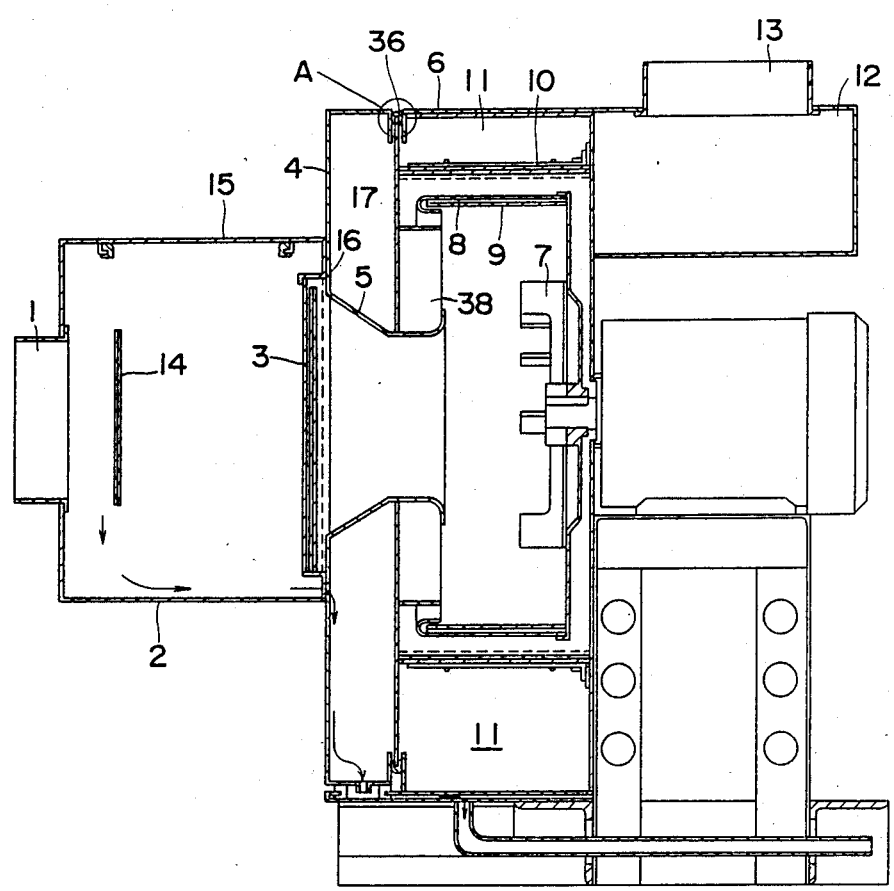
Figure 12:
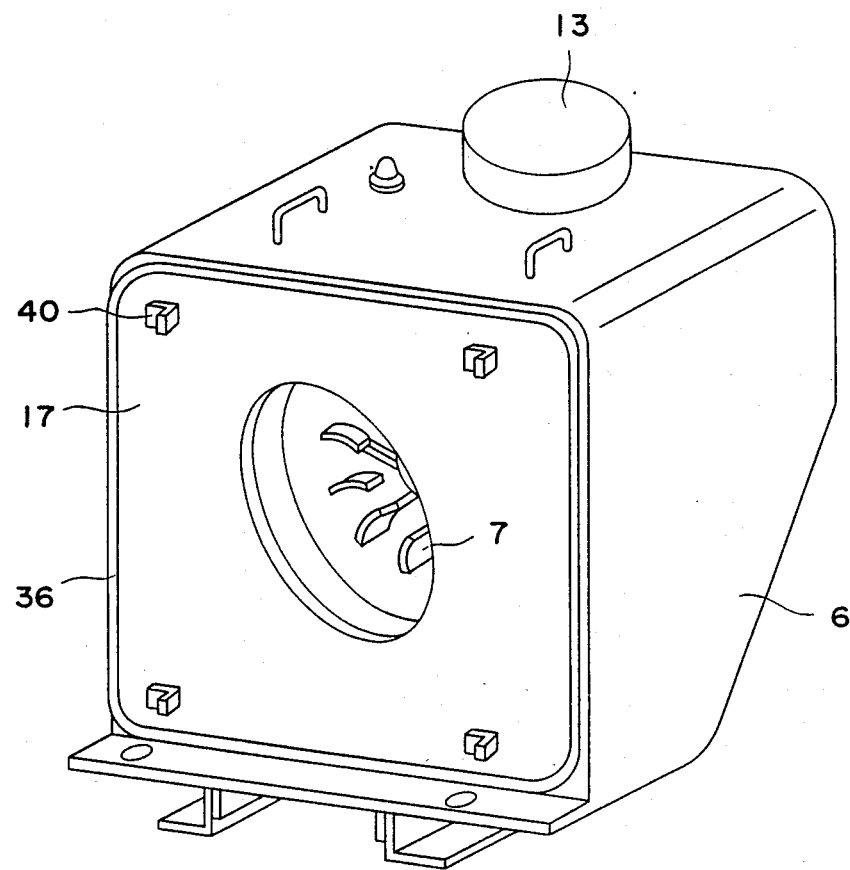
Figure 14:
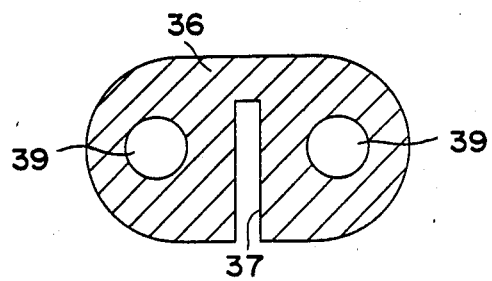

FIG. 11 to FIG. 15 denote a fourth embodiment, in which, as shown in FIG. 11 and FIG. 12, a shielding plate 17 is inserted between the main body case 6 and the door 4, and a groove 37 is formed inside one packing 37, while the outer circumference of this shielding plate 17 is inserted into this groove 37.

Figure 13:
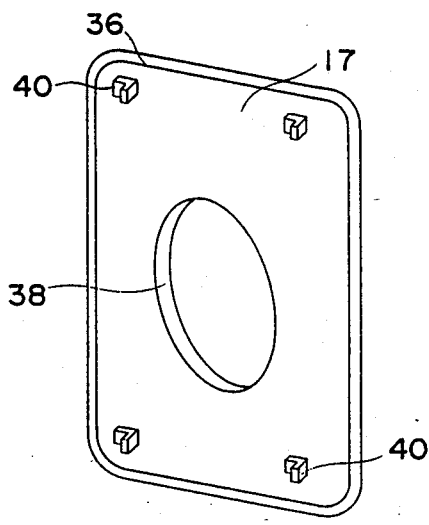
Figure 15:
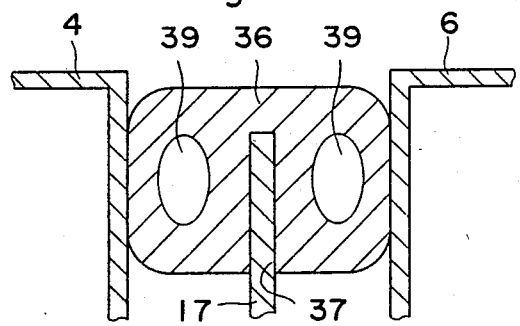

This shielding plate 17 has a cylindrical part 38 in which the suction guide 5 is inserted in the middle as shown in FIG. 13, and the packing 36 is fitted on the outer circumference. The packing 36 forms the groove 37 in its inner circumference, and blank spaces 39 are formed at both sides of the groove 37 as shown in the sectional view in FIG. 14, and the both ends of the packing 36 are formed in a round shape. To mount the packing 36 on the shielding plate 17, the groove 37 is inserted into the outer circumference of the shielding plate 17 as shown in FIG. 15. This shielding plate 17 is screwed to the main body case 6, and stopping tools 40 are provided at four positions on the front side, and the shielding plate 17 and the door 4 are mounted.

The front surface of the main body case 6 is widely opened except for the mounting width of the packing 36 of the shielding plate 17. By fitting the shielding plate 17 to the main body case 6, this opening is clogged, and it abuts against the front end of the fixed filter 10, thereby shutting off the ventilation inside and outside the fixed filter 10.

In this constitution, by fitting the packing 36 to the shielding plate 17, sealing of the door 4 and main body case 6, and sealing of inside and outside of the equipment are achieved, and it is possible to prevent leak of air containing much oil mist in the door into the ventilation chamber 11, or leak of the air inside the door 4 or ventilation chamber 11 to outside.

Since the packing 36 has the groove 37 formed in its inner circumference, the packing 36 can be mounted on the outer circumference of the shielding plate 17, which makes it possible to increase the size of the opening of the main body case 6. At the same time, the both side of the shielding plate 17 can be sealed by one piece, and adhesive is not needed for mounting. The packing 36 can be mounted only by inserting the groove 37 into the shielding plate 17, and the packing 36 can be mounted and replaced easily. The blank space 39 increases the elasticity at both ends of the packing 36, and enhances the contact.

Moreover, since the packing 36 is pressed from both side as being inserted between the door 4 and main body case 6, the groove 37 and the shielding plate 17 contact with each other tightly, and the groove 37 is sealed.

Therefore, by forming the groove 37 in the inner circumference of the packing 36, the packing 36 can be fitted on the outer circumference of the shielding plate 17, and the opening of the main body case 6 can be increased in size, and maintenance in the main body case 6 is facilitated, and also mounting and replacement of the packing 36 become easier. As a result, the oil mist remover of this invention becomes very easy in maintenance.

What is claimed is:

1. An oil mist remover which is for removing a mixture such as oil mist, etc, and used in purifying polluted air containing oil mist comprising:
    a main body case having a door at one end and an exhaust hole at another end;
    a straightening box which is provided on said door and provided with a suction hole;
    a suction guide introducing said polluted air containing oil mist, which has been sucked in said straightening box through said suction hole, into said main body case through said door;
    a baffle plate provided near said suction hole in said straightening box, said baffle plate obstructing said air from flowing straight;
    a cylindrical rotary filter rotatably provided in said main body case so that air passing through said suction guide flows into said cylindrical rotary filter;
    a cylindrical fixed filter fixedly provided in said main body case and around said rotary filter, said fixed filter being designed so that air passing through said rotary filter passes through said fixed filter;

a fan provided in said rotary filter and coaxially thereto, said rotary fan rotating together with said rotary filter;

a driving means driving said rotary fan and rotary filter so that said air containing oil mist is sucked into said main body case through said suction hole and then passes through said rotary filter and fixed filter into said exhaust hole;

a drain path introducing a drain containing oil collected in said straightening box into said door;

a drain chamber provided under said main body case and door and used commonly for them, said drain, which is collected in said main body case and door and contains oil therein, flowing into said drain chamber through holes provided in the bottom walls of said main body case and door; and a drain discharge means connected to said drain chamber, said drain discharge means discharging said drain from said drain chamber.

2. A device according to claim 1, wherein said door includes a shielding plate which supports said suction guide and is provided with a packing at its circumference, said packing being provided in a manner that the circumference of said shielding plate is inserted a groove formed inner side of said packing, said packing being provided with blank spaces therein at both sides of said groove and along said circumference of said shielding plate, and said shielding plate being pressedly and interposedly provided between said main body case and said door in a manner that said blank spaces are squeezed.

3. A device according to claim 1, further comprising an opening provided in said drain chamber and facing upward, said opening being designed so that when said door is closed said opening and said hole provided in said bottom wall of said door are connected.

4. A device according to claim 3, wherein said drain path includes a chamber which is provided at a lower portion of said straightening box so as to prevent a reverse flow of said oil, said chamber being connected to said straightening box through a hole provided in the bottom wall of said straightening box and further connected to the inside of said door through a hole provided in a side wall of said door, said hole of said straightening box being larger than said hole of said door.

5. A device according to claim 1, wherein said drain path includes a chamber which is provided at a lower portion of said straightening box so as to prevent a reverse flow of said oil, said chamber being connected to said straightening box through a hole provided in the bottom wall of said straightening box and further connected to the inside of said door through a hole provided in a side wall of said door, said hole of said straightening box being larger than said hole of said door.

6. A device according to claim 5, further comprising a filter provided above said hole of said straightening box for removing dust, said filter being able to be changed when a cover of said straightening box is opened.

* * * * *